(12) United States Patent
Brown

(10) Patent No.: US 7,659,648 B2
(45) Date of Patent: Feb. 9, 2010

(54) MOTOR WITH RAISED ROTOR

(75) Inventor: Fred A. Brown, Coronado, CA (US)

(73) Assignee: Comair Rotron Inc., San Diego, CA (US)

( * ) Notice: Subject to any disclaimer, the term of this patent is extended or adjusted under 35 U.S.C. 154(b) by 0 days.

(21) Appl. No.: 10/797,901

(22) Filed: Mar. 10, 2004

(65) Prior Publication Data

US 2005/0200216 A1   Sep. 15, 2005

(51) Int. Cl.
   *H02K 5/16* (2006.01)
(52) U.S. Cl. .................. 310/90; 310/67 R
(58) Field of Classification Search ............ 310/67 R, 310/90, 71; 360/98.07, 99.08
   See application file for complete search history.

(56) References Cited

U.S. PATENT DOCUMENTS

| 1,866,478 | A | * | 7/1932 | Mortensen | 384/225 |
|---|---|---|---|---|---|
| 3,604,962 | A | | 9/1971 | Larson et al. | 310/67 |
| 4,613,778 | A | | 9/1986 | Wrobel et al. | 310/90 |
| 4,779,165 | A | | 10/1988 | Elsaesser et al. | 360/97 |
| 5,169,245 | A | | 12/1992 | Harada et al. | 384/610 |
| 5,258,672 | A | | 11/1993 | Wrobel | 310/42 |
| 5,610,462 | A | | 3/1997 | Takahashi | 310/90 |
| 5,710,678 | A | * | 1/1998 | Leuthold et al. | 360/99.08 |
| 5,747,908 | A | | 5/1998 | Saneshige et al. | 310/91 |
| 5,774,302 | A | * | 6/1998 | Elsaesser et al. | 360/98.07 |
| 5,973,429 | A | | 10/1999 | Swensgard et al. | 310/90 |
| 5,982,064 | A | | 11/1999 | Umeda et al. | 310/90 |
| 6,026,103 | A | | 2/2000 | Oliver et al. | 372/37 |
| 6,222,291 | B1 | * | 4/2001 | Boutaghou | 310/90 |
| 6,271,609 | B1 | * | 8/2001 | Hollenbeck et al. | 310/71 |
| 6,489,700 | B1 | | 12/2002 | Heiberger et al. | 310/178 |
| 6,545,381 | B1 | * | 4/2003 | Fehrenbacher | 310/90 |
| 6,710,488 | B2 | | 3/2004 | Kronenberg et al. | 310/90 |
| 6,856,492 | B2 | * | 2/2005 | Oveyssi | 360/265.2 |

FOREIGN PATENT DOCUMENTS

GB   2083953 A   *   3/1982   ............. 310/90

\* cited by examiner

*Primary Examiner*—Thanh Lam
(74) *Attorney, Agent, or Firm*—Dobrusin & Thennisch PC

(57) ABSTRACT

A motor has a stator, a rotor having a shaft, and a sleeve bearing in contact with the rotor shaft. The sleeve bearing also is fixedly secured to the stator. Additionally, the motor also has a movable support member axially supporting the shaft. The movable support member illustratively is movable relative to the shaft. The rotor center of gravity coincides approximately with the opening in the bearing-shaft interface.

5 Claims, 3 Drawing Sheets

MOTOR WITH RAISED ROTOR

FIELD OF THE INVENTION

The present invention relates to motors, and more particularly, to a support of a rotor within a motor having a sleeve bearing.

BACKGROUND OF THE INVENTION

Motors are employed in a multitude of situations requiring various orientations. Among other uses, motors can be used in fans or drive a toy car. A fan driven by a brushless DC motor, for example, has a movable portion (i.e., a rotor) rotatably coupled with a stationary portion (i.e., the stator). The rotor typically has an impeller (or propeller) coupled to a shaft that is rotatably secured to a bearing within the stator. To rotate the rotor, the stator produces a rotating magnetic field that, when interacting with a magnet in the rotor, causes the rotor to rotate about an axis defined by the shaft.

Motors can use different types of bearings to rotatably secure the shaft to the stator. For example, some motors use a sleeve bearing, which generally is a highly lubricated, porous sleeve that maintains the radial position of the rotor within the motor. Lubrication of the porous walls of the sleeve bearing should minimize friction that arises between the shaft and sleeve walls, thus permitting the rotor to more freely rotate.

The hub of the rotor (in conjunction with other components) commonly maintains the axial position of the rotor. More particularly, some fans have a thrust washer captured between the rotor hub and sleeve bearing. One function of the thrust washer is to act as a loose lid on the sleeve bearing, thus retaining (to some extent) lubricant within the porous walls of the sleeve bearing. During operation, the hub rubs against the thrust washer that in turn rubs against the top of the sleeve bearing. If this friction is not minimized, fan efficiency is reduced, which leads to the need for larger fan motors and additional power consumption. Both consequences are adverse to the use of fans in cooling increasingly smaller and hotter operating electrical components and equipment.

SUMMARY OF THE INVENTION

In accordance with one aspect of the invention, a motor has a stator, a rotor having a shaft, and a sleeve bearing in contact with the rotor shaft. The sleeve bearing also is fixedly secured to the stator. Additionally, the motor also has a movable support member axially supporting the shaft. The movable support member illustratively is movable relative to the shaft.

In certain embodiments, the motor has a housing encasing the stator to form a recess for supporting the moveable support member. The moveable support member may be a spherical member, and, in some cases, may be a ball bearing. The recess may have a depth less than a radius of the spherical member.

In other embodiments, the motor may contain a retaining washer about the shaft. The retaining washer may be contained between the lower end of the shaft and the sleeve bearing.

In additional embodiments, the motor may contain a rotor hub coupled to the shaft and spaced from the sleeve bearing.

In further embodiments, the rotor may include a rotor magnet oriented with the stator to bias the rotor toward the moveable support member.

In other embodiments, the moveable support member may contact the shaft when the motor is right side up and when the motor is upside down.

In accordance with another aspect of the invention, a motor has a stator with a sleeve bearing, a rotor having a hub mounted to a shaft that is rotatably coupled with the sleeve bearing, and a movable support member supporting the weight of the rotor. The shaft has a coupled retaining member.

In certain embodiments, the motor also may have a housing about the stator. In some embodiments, the retaining member may be a washer secured to the shaft. In additional embodiments, the rotor may include blades for moving air. In other embodiments, the rotor includes a rotor magnet that normally biases the rotor toward the support member.

The support member may have a number of shapes. For example, it may have a spherical shape. The motor may be any type of motor and thus, the stator may have DC commutation circuitry.

In accordance with a further aspect of the invention, a motor has a stator, a rotor having a shaft, and a sleeve bearing in contact with the rotor shaft. The sleeve bearing also is fixedly secured to the stator. Additionally, the motor also has a movable means for axially supporting the shaft. The movable support means illustratively is movable relative to the shaft.

In one embodiment, the moveable means for axially supporting may include a ball bearing. In another embodiment, the motor may include a housing encasing the stator with the housing forming a recess for supporting the moveable means. Additionally, the shaft may have an attached rotor hub spaced from the sleeve bearing. In certain embodiments, the rotor may include means for biasing the rotor toward the moveable means for axially supporting.

BRIEF DESCRIPTION OF THE DRAWINGS

The foregoing features of the invention will be more readily understood by reference to the following detailed description, taken with reference to the accompanying drawings, in which.

DETAILED DESCRIPTION OF ILLUSTRATIVE EMBODIMENTS

In illustrative embodiments of the invention, a motor has a support member (e.g., a movable ball bearing) that normally supports the weight of a rotor shaft. Such embodiments are particularly effective when incorporated into a motor that uses a sleeve bearing. Specifically, the support member may lift the rotor shaft a small amount to ensure that the rotor hub does not frictionally contact any components on the stator (e.g., the sleeve bearing). Consequently, the rotor has less frictional resistance as it rotates about its axis.

The motor may be implemented as a fan that cools heat generating components, such as hot water heaters or enclosed computer compartments. Certain aspects of such cooling thus can impose particular demands on fan motor reliability. For example, failure of the fan can cause catastrophic overheating of components (e.g., computer processors within a computer system). Moreover, because a fan may not be easily accessible, replacement or repair of the fan may be complicated and lead to extended downtime of electrical equipment. Fan operation is further complicated because of the variety of possible fan orientations and positions. Details of various embodiments of the invention are discussed below.

Figure 1B:
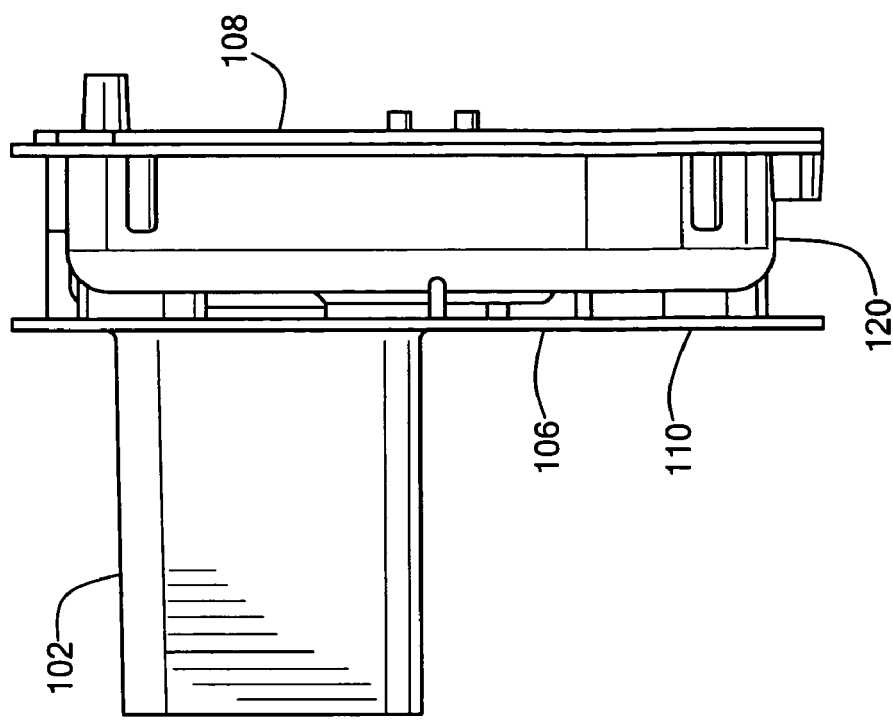
FIGS. 1a and 1b schematically show an illustrative motor implemented within a fan assembly that may incorporate various embodiments of the invention.
Figure 1A:
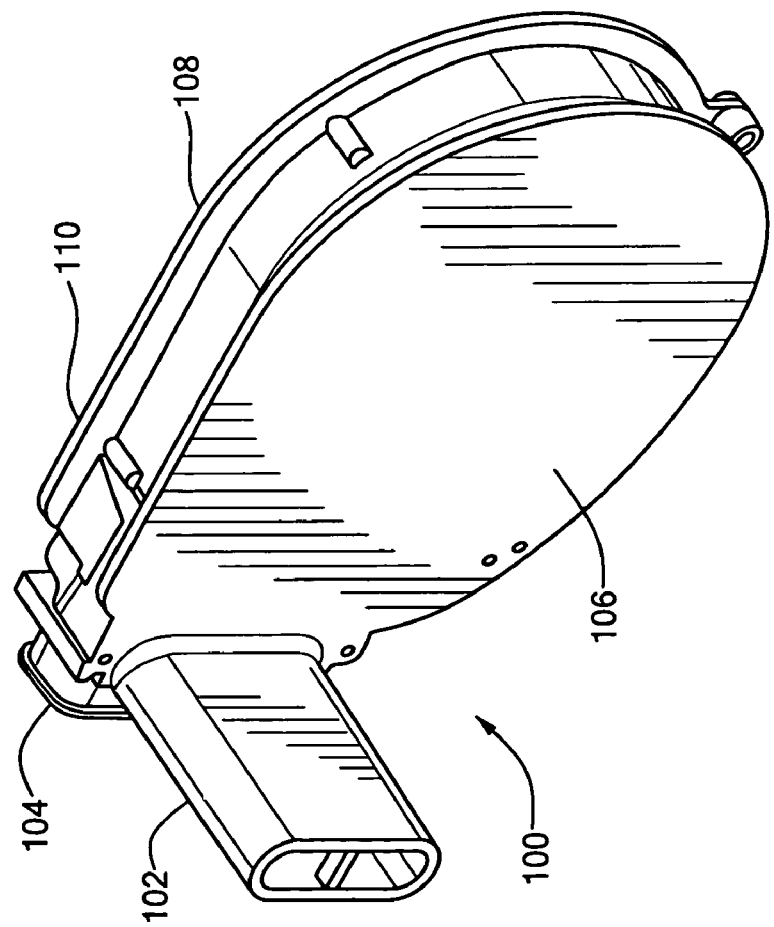

FIG. 1a shows a fan assembly 100 that may incorporate illustrative embodiments of the invention. The fan assembly 100 contains a housing 110 formed by a front cover 106 and a back cover 108. The front cover forms an inlet duct 102 while the back cover forms an outlet duct 104. The front and back covers 106 and 108 illustratively are removably snap fit together to form an interior that contains a fan 120 (FIG. 1b). Accordingly, the interior components (discussed below) may be easily accessed. In alternative embodiments, however, the front and back covers 106 and 108 are fixedly secured together.

Figure 2:
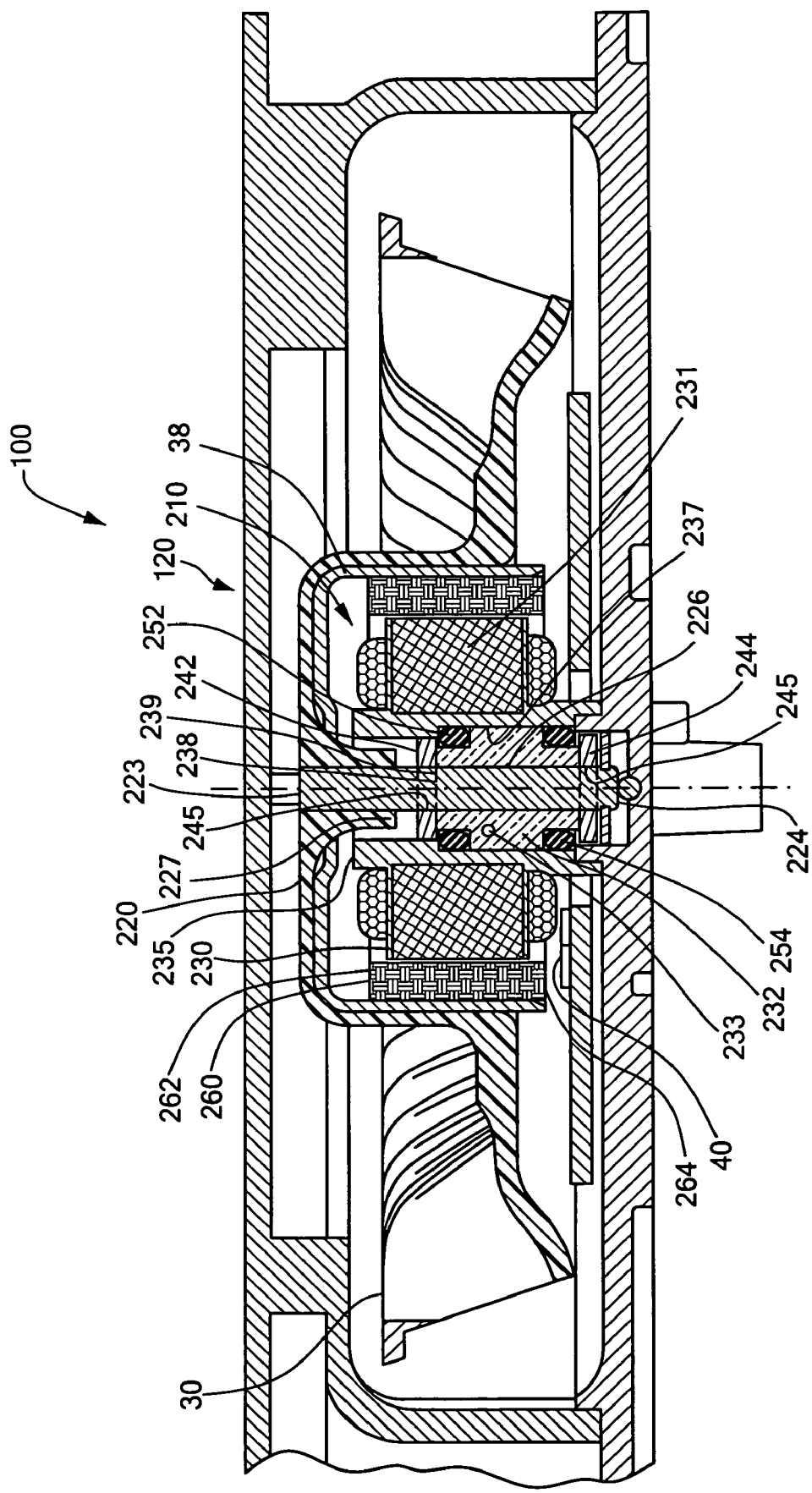
FIG. 2 schematically shows a cross-sectional view of the fan shown in FIG. 1 implemented in accordance with illustrative embodiments of the invention.

FIG. 2 schematically shows a cross-sectional view of the fan assembly 100 shown in FIG. 1. The fan 120 includes, among other things, a brushless DC fan motor 210. Specifically, the fan motor 210 has a rotational portion (i.e., a rotor 220) that is rotatably coupled with a stationary portion (i.e., a stator 230). As noted above, the stator 230 illustratively has an electromagnet 231 that interacts with a permanent magnet 260 in the rotor to cause the rotor 220 to rotate. To that end, the stator 230 illustratively has conventional brushless DC commutation circuitry 40 (e.g., Hall sensors, switches, etc. ... ) and DC motor components (poles, coils, etc. ... ) commonly included in the stator 230 of a brushless DC motor.

As suggested above, the rotor 220 includes an annular permanent magnet 260 within a steel cup 38, and a plastic impeller 30 having fan blades extending from a plastic hub 227 mounted about the steel cup 38. Of course, the impeller 30 also may be a propeller or other similar apparatus utilized in fans. A sleeve bearing 232 in the stator assembly 235 receives a central shaft 223, which is secured to the hub 227.

It should be noted that discussion of a brushless DC motor is exemplary and not intended to limit all embodiments of the invention. For example, some aspects of the invention could be applied to synchronous motors or DC motors with brushes. Accordingly, those in the art may apply principles of the invention to other types of motors. In a similar manner, discussion of a fan is exemplary and thus, not intended to limit all embodiments of the invention. Accordingly, those in the art may apply principles of the invention to motors implemented in other types of devices.

The sleeve bearing 232 illustratively is slip fit into a chamber 237 in the stator 230 in a conventional manner. An upper O-ring 252 and lower O-ring 254 secure the sleeve bearing 232 within the stator chamber 237. In illustrative embodiments, the sleeve bearing 232 is formed by means of conventional powdered metal manufacturing processes to form its cylindrical, porous surface. As known by those in the art, the porosity of the sleeve bearing enables its surface to receive and, to some extent, retain a lubricant, such as oil or petroleum derivative product. The lubricant reduces frictional resistance caused by the contact between the outer surface of the shaft and the inner surface of the sleeve bearing. Of course, to permit rotation, the inner diameter of the sleeve bearing 232 illustratively is larger than the outer diameter of the shaft 223. For example, the sleeve bearing 232 may have an inner diameter that is about 0.004 to 0.010 inches larger than the outer diameter of the shaft 223. These clearances should facilitate proper motor operation.

In addition, the center of gravity 238 of the rotor 220 that includes shaft 223 may be arranged to coincide with the upper opening 239 in the sleeve bearing 232 for shaft 223. As a result, the life of sleeve bearing 232 may be extended. A center of gravity 238 above this point may lead to ovaling out of the upper opening 239. A center of gravity 238 below this point may lead to chatter.

The shaft 223 also has upper and lower thrust washers 242 and 244 to at least partially retain lubricant within the sleeve bearing 232. As discussed in greater detail below, the upper and lower thrust washers 242 and 244 do not entirely retain lubricant within the sleeve bearing 232. Instead, they effectively act as unsealed lids to the sleeve bearing 232, thus creating some resistance to migrating lubricant. Accordingly, the top thrust washer 242 may be nominally positioned to be substantially flush against the top of the sleeve bearing 232. In a similar manner, the bottom thrust washer 244 also may be nominally positioned substantially flush against the bottom of the sleeve bearing 232.

The thrust washers 242 and 244 are not fixedly secured to the shaft or sleeve bearing. Instead, the thrust washers 242 and 244 merely are slip fit around the outer surface of the shaft 223. Accordingly, during operation, the thrust washers 242 and 244 may rotate at a different rate than that of the shaft 223. Among other things, this difference is based upon the amount of lubricant the thrust washers receive. Due to their relatively loose coupling about the shaft 223, the thrust washers 242 and 244 may slide upwardly or downwardly during the lifetime of the motor 210. The amount of this movement can be limited, however, by axially adjacent components, such as a rotor hub 227.

Figure 3:
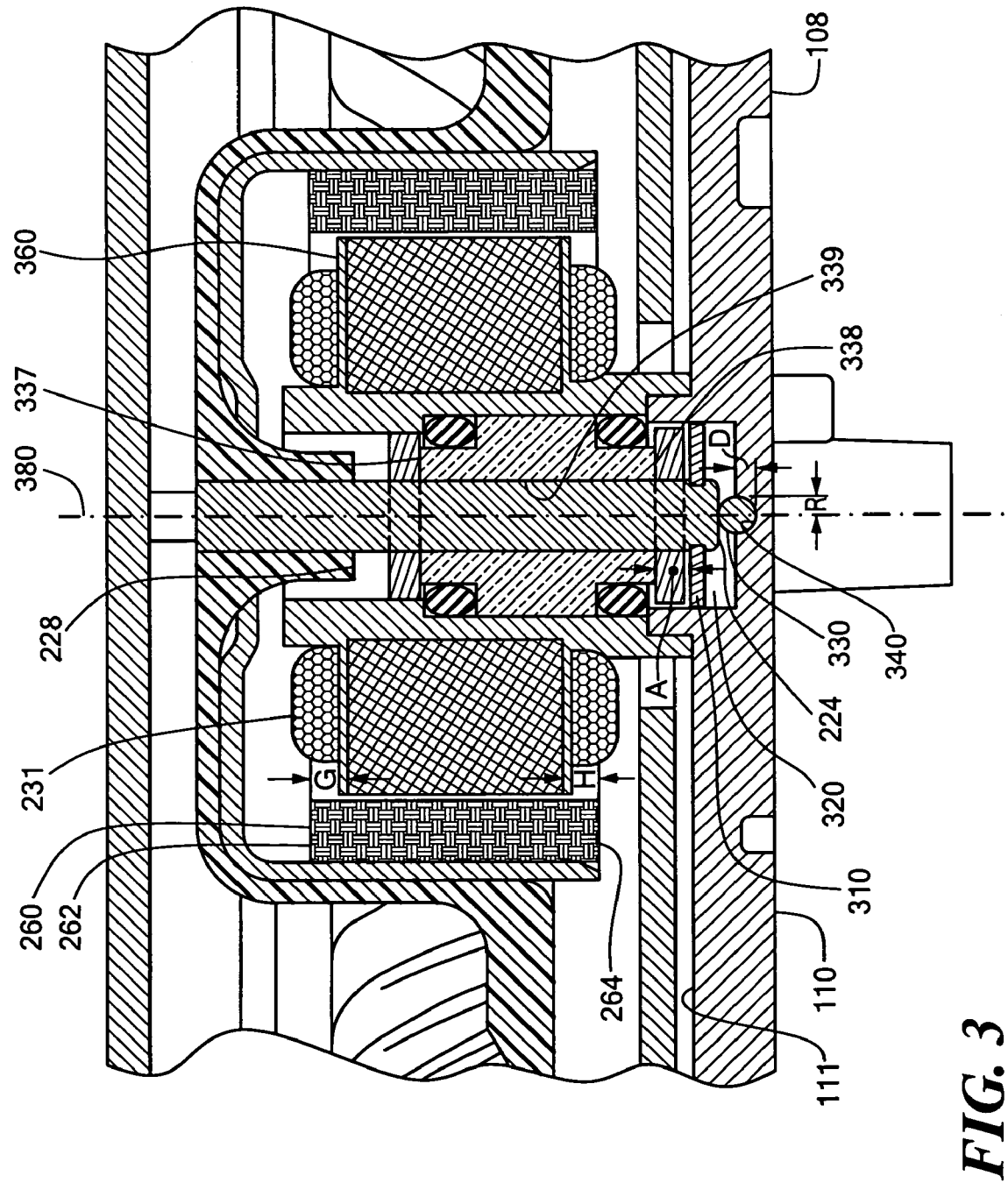
FIG. 3 schematically shows a blown-up cross-sectional view of the circled portion of the fan shown in FIG. 2.

The motor 210 also includes a retaining member 310 (FIG. 3) for ensuring that the rotor 220 remains appropriately axially positioned within the sleeve bearing 232. Among other things, the retaining member 310 may be a washer that normally remains positioned within a closed, cylindrically shaped base portion 320 of the housing 110. To minimize or eliminate frictional resistance, the retaining member 310 has a maximum transverse dimension that is less than the minimum inner dimension of the cylindrically shaped base portion 320 of the housing 110.

Moreover, unlike the thrust washers 242 and 244, the retaining member 310 may be secured to the shaft 223 a short distance from the bottom of the sleeve bearing 232. In illustrative embodiments, that distance is slightly greater than the maximum thickness of the lower thrust washer 242. Because it is not axially movable along the shaft 223, the retaining member 310 should substantially maintain the axial position of the rotor 220 within the sleeve bearing 232. Those skilled in the art can select the position of the retaining member 310 on the shaft 223 to optimize performance.

Alternative embodiments may not use a washer as the retaining member 310. For example, the shaft 223 may have a transverse through-hole through which a pin is inserted. Accordingly, discussion of a washer is exemplary and not intended to limit the scope of various other embodiments of the invention.

In accordance with illustrative embodiments of the invention, the rotor 220 is slightly elevated to minimize friction between 1) the rotor hub 227 and the upper thrust washer 242 and 2) corresponding friction between the thrust washer 242 and the sleeve bearing 232. In other words, the lift should significantly reduce or eliminate the frictional contact (i.e., resistance) between these adjacent components. Minimizing (or eliminating) this friction should improve motor efficiency. To that end, a base interior surface 111 of the housing 110 has a recess 340 that contains a movable support member 330, such as a single ball bearing. The support member 330 normally supports the entire weight of the rotor 220.

It should be noted that discussion of the spherically shaped support member 330 is illustrative and not intended to limit various other embodiments of the invention. For example, in other embodiments, the movable member 330 may be disk shaped with rounded surfaces, or cylindrically shaped. Of course, the recess 340 should be shaped to at least in part retain the support member 330. Moreover, the bottom 224 of the shaft 223 may be shaped to compliment the shape or contour of the support member 330.

The depth and shape of the recess 340 in the housing 110 illustratively are selected to control the amount of lift desired. In illustrative embodiments, the recess 340 is spherically shaped with an inner diameter that is slightly larger than the outer diameter of the ball bearing 330. Alternative recesses may be other shapes, such as oval or cylindrically shaped. As an example, the depth of a spherically shaped recess may be selected (based on the support member 330) to cause the support member 330 to lift the rotor about 0.005 inches higher than it would be if the support member 330 and recess 340 were absent. Accordingly, to give a higher lift to the rotor 220, the support member 330 is spherically shaped with a radius that is greater than the depth of the recess 340. Alternatively, to give a smaller lift to the rotor 220, the depth of the recess 340 can be greater than the radius of the spherical support member 330. Accordingly, depending upon the amount of rotor lift desired, the depth of the recess 340 can range from a minimal depth to one nearly approximating the diameter of the support member 330.

This lift illustratively lifts the rotor hub 227 so that its distance from the sleeve bearing 232 is slightly greater than the thickness of the upper thrust washer 242. For example, the support member 330 and recess 340 may cooperate to lift the rotor 220 a distance of about 0.005 inches. In that case, if the upper thrust washer 242 has a thickness of about 0.1 inches, then the distance between the sleeve bearing 232 and the rotor hub 227 is about 0.105 inches. Consequently, the lift gives about a 0.005 inch clearance between the nominally positioned upper thrush washer 242 and the rotor hub 227.

Those skilled in the art thus should understand that this lift changes the surface that supports the weight of the rotor 220. Specifically, the support member 330 supports the rotor weight; the top surface 337 of the sleeve bearing 232 does not. Indeed, an internal motor component (i.e., the support member 330) still supports the weight of the rotor 220. That internal motor component 330, however, has a much smaller surface area than hub 227 and receives some lubricant (discussed below). Moreover, the material choice of the support member 330 can further enhance the friction mitigation goals. For example, rather than having the plastic hub 227 rub against the metal sleeve bearing 232, illustrative embodiments of the invention use a lubricated metal ball bearing 330 to frictionally contact the metal shaft 232.

As noted above, the lower thrust washer 244 does not act as an efficient seal to the sleeve bearing 232. More particularly, the thrust washers 242 and 244 are not intended to be full seals and, thus, permit some leakage over time. Consequently, lubricant may migrate from the sleeve bearing 232, along the shaft 223, and to the support member 330. If the support member 330 is a metal ball bearing, then the migrating lubricant should reduce the friction caused by contact between the bottom 224 of the shaft 223 and the top of the ball bearing 330. Moreover, to some extent, the closed base portion 320 of the housing 110 should retain the migrating lubricant within the housing 110. Accordingly, the lubricant also should reduce the frictional contact between the ball bearing 330 and the internal surface of the recess 340.

To preserve proper positioning of the rotor 220 with respect to the stator 230, the shaft lower surface 224 abuts the support member 330. During operation, this abutment is promoted by a magnetic bias produced by the rotor magnet 260 and stator pole 360. Specifically, the rotor magnet 260 is designed to have an axial asymmetry with stator pole 360, thus axially biasing the rotor shaft 223 toward the support member 330.

To those ends, the height of the rotor magnet 260 exceeds the height of the stator pole 360. Although the magnetic field between the rotor magnet 260 and the stator pole 360 is predominantly radial in direction, where the rotor magnet 260 does not overlap the stator pole 360, there is a component of magnetic field in the axial direction. Since the overlap (shown as "G" in FIG. 3) at the upper magnet end 262 exceeds the overlap (shown as "H" in FIG. 3) at the lower magnet end 264, there is an axial force pulling the rotor 220 and the rotor shaft 223 toward the back cover 108. This force thus biases the rotor 220 toward the moveable support member 330. As a result, whether the motor 210 is right side up or upside down, the shaft lower end 224 should remain in contact with and supported by the moveable member 330. Of course, if some condition overcomes this bias, or if the motor 210 is not operating, the retaining member 310 still maintains the axial position of the rotor 220.

During operation, the fan motor 210 rotates the rotor about the axis 380 defined by the shaft 223. The thrust washers 242 and 244 also rotate about the shaft axis 380 at a speed controlled by that of the shaft 223 and the amount of lubricant they receive. The thrust washers 242 and 244 therefore frictionally rub against the top 337 and bottom 338 of the sleeve bearing 232. Moreover, to some extent, the outer surface 226 of the shaft 223 also may frictionally rub against the inner surface 245 of the thrust washers 242 and 244. This resistance nevertheless can be minimized by the lubricant.

When the rotor 220 rotates, the top thrust washer 242 also may move axially between the top 337 of the sleeve bearing 232 and the bottom 228 of the rotor hub 227. This axial movement is based upon the amount of lift provided by the support member 330. Consequently, because illustrative embodiments maintain a relatively small amount of lift, this axial movement should have a negligible impact on motor performance.

The bottom thrust washer 244 also may move axially between the retaining member 310 and the bottom of the sleeve bearing 338. Of course, this amount of movement also is controlled by the clearance between the bottom thrust washer 244 and the retaining member 310 (when the bottom thrust washer 244 is flush against the sleeve bearing 232). This clearance also is a function of the amount of lift provided by the support member 330. As an example, if the clearance is about 0.005 inches, then the thrust washer 244 may have an axial freedom of movement for about 0.0.005 inches along the shaft 223. Moreover, in this example, if the bottom thrust washer 244 has a thickness of about 0.01 inches, then the retaining member 330 is about 0.0105 inches from the bottom 338 of the sleeve bearing 232.

Also during operation, lubricant drawn from pores 233 lubricates contacts points between the shaft 223 and the inner walls 339 of the sleeve bearing. In addition, lubricant also lubricates contact points between the thrust washers 242 and 244 and sleeve bearing 223 (if there is contact), and contact points between the support member 330 and the bottom 224 of the shaft 223.

Wear of support member 330 may be reduced by the continual movement of the support member 330. Specifically, when the shaft 223 rotates, the support member 330 rotates within the recess 340 to continually expose different regions of its surface to contact with the shaft lower end 224. Lubricant contained within the cavity 320 may ease the relative movement between the support member 330 and the shaft lower end 224.

In certain situations, such as during shipment, the fan assembly 100 may be shaken to an extent that the magnetic coupling between rotor magnet 260 and stator 360 is unable to maintain contact between moveable member 330 and shaft lower end 224. Under these circumstances, the retaining member 310 is positioned to maintain the moveable member 330 within the recess 340. In illustrative embodiments, since the distance between the retaining member and the lower thrust washer 244 is less than the radius of the recess 340, the retaining member 310 contacts the lower thrust washer 244 to halt axial movement of the shaft 223 prior to disengagement of the moveable member 330 from the recess 340.

Accordingly, illustrative embodiments of the invention improve on the prior art by substantially reducing or eliminating frictional resistance produced when the rotor hub 227 contacts either the top thrust washer 242 or the sleeve bearing 232. The support member 330 facilitates this by lifting the rotor 220 while moving within the recess 340. Among other benefits, this reduced friction improves motor efficiency and reduces heat produced by the motor 210. Reducing the heat can be especially important when the motor 210 is implemented as a fan in a relatively hot location.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A fan assembly comprising:
    a housing wherein the housing contains a front and a back cover, and the front cover forms an inlet duct and the back cover forms an outlet duct;
    a brushless DC fan motor wherein the motor has a stator portion;
    wherein the stator portion contains an electromagnet and DC communication circuitry;
    a rotor having a shaft and a plurality of fan blades extending from a hub;
    a sleeve bearing in contact with the rotor shaft, the sleeve bearing being fixedly secured to the stator;
    an upper and lower thrust washer not fixedly secured to the shaft or sleeve bearing;
    a movable support member for axially supporting the shaft, the movable support member being movable relative to the shaft, wherein the movable support member contacts the shaft when the motor is right side up and when the motor is upside down, and the shaft is shaped to compliment the shape or contour of the support member; and
    wherein the housing encases the stator, motor, and, rotor, and the housing forms a recess for supporting the movable support member, and the support member has a radius that is greater than the depth of the recess.

2. The fan assembly as defined by claim 1 wherein the movable support member for axially supporting is a ball bearing.

3. The fan assembly as defined by claim 1 wherein the shaft has an attached rotor hub that is spaced from the sleeve bearing.

4. The fan assembly as defined by claim 1 wherein the rotor includes means for biasing the rotor toward the movable means for axially supporting.

5. The fan assembly as defined by claim 1 wherein the center of gravity of the rotor coincides with an opening in the sleeve bearing that accommodates the shaft.

* * * * *